United States Patent [19]

Cape et al.

[11] 4,361,078
[45] Nov. 30, 1982

[54] HYDRAULIC BRAKE ACTUATOR HAVING SPRING-APPLIED BACK-UP BRAKE WITH MANUAL RELEASE MEANS

[75] Inventors: John Cape, Caledonia; Eric Smith, Burlington, both of Canada

[73] Assignee: WABCO Ltd., Hamilton, Canada

[21] Appl. No.: 243,984

[22] Filed: Mar. 16, 1981

[51] Int. Cl.³ .............................. F01B 3/04; F01B 7/04
[52] U.S. Cl. ........................................ 92/31; 188/170; 188/106 F; 192/91 A; 92/63
[58] Field of Search ................... 92/17, 21 R, 21 MR, 92/24, 27, 28, 33, 63, 130 A

[56] References Cited

U.S. PATENT DOCUMENTS

| | | | |
|---|---|---|---|
| 4,018,140 | 4/1977 | Engle | 92/31 |
| 4,063,491 | 12/1977 | Roger et al. | 92/63 |
| 4,226,168 | 10/1980 | Staltmeir | 92/130 |
| 4,280,398 | 7/1981 | Kerscher | 92/63 |

FOREIGN PATENT DOCUMENTS 1119338  6/1956  France ....................................... 92/17

Primary Examiner—Martin P. Schwadron
Assistant Examiner—Ali I. Tangoren
Attorney, Agent, or Firm—G. J. Falce

[57] ABSTRACT

In a brake actuator device having a fluid pressure actuated service brake and a spring-applied, fluid pressure released auxiliary brake that cooperates with the service brake via a friction clutch mechanism, there is provided a manual release mechanism for releasing the spring-applied brake in the absence of fluid pressure. The manual release mechanism operates to relieve the tension of the actuating spring by causing the piston through which the spring operates to engage a stop formed on the casing of the brake actuator device, so that the spring is caged at its opposite ends by the casing of the brake actuator device. Extension of a retracting screw to initiate the manual release operation is automatically retracted following engagement of the spring piston with its stop to reset the manual release mechanism in readiness for a subsequent operation.

8 Claims, 1 Drawing Figure

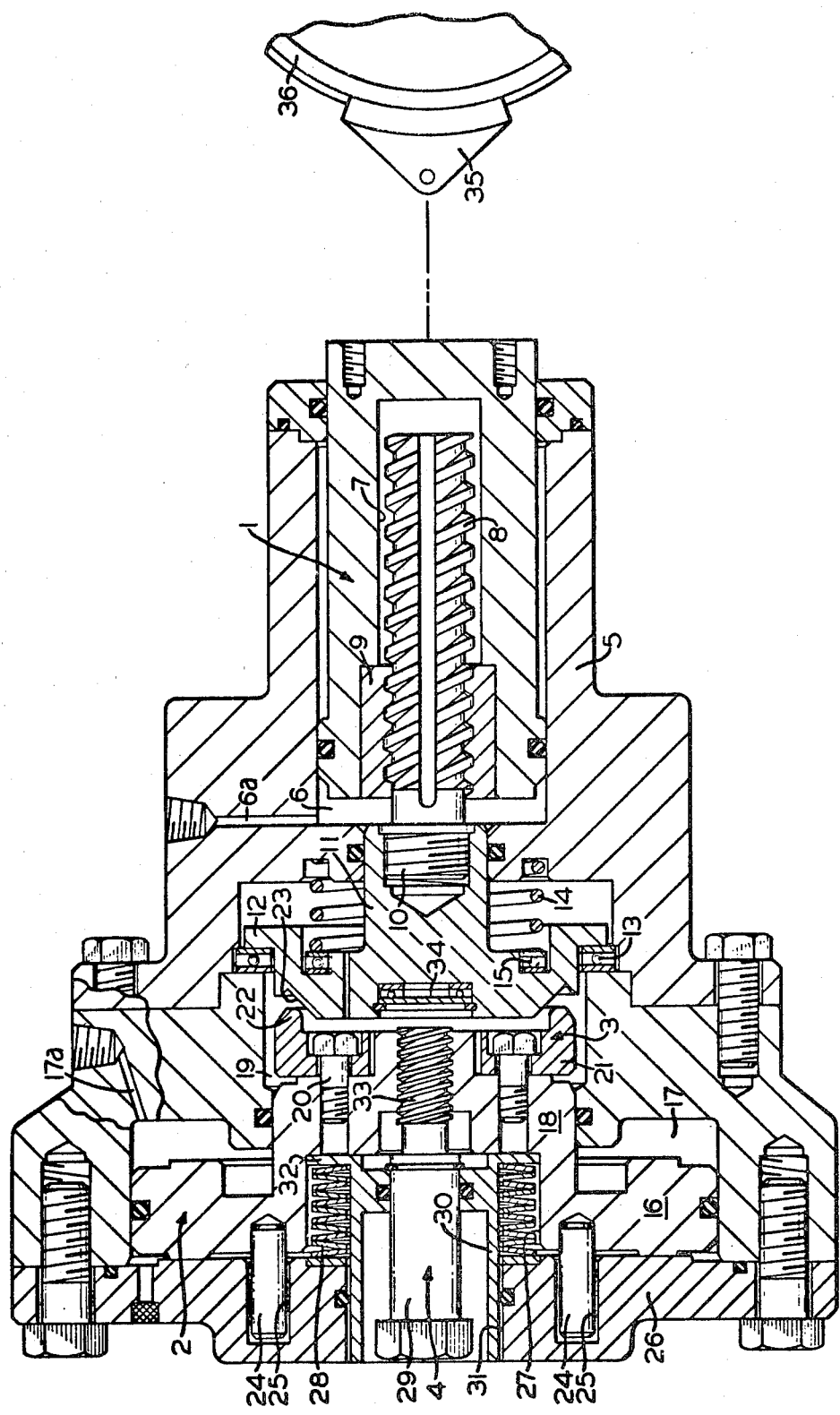

HYDRAULIC BRAKE ACTUATOR HAVING SPRING-APPLIED BACK-UP BRAKE WITH MANUAL RELEASE MEANS

BACKGROUND OF THE INVENTION

The present invention is related to fluid pressure operated brake actuators and particularly to transit type railway car brake actuators having a spring-applied, fluid pressure released auxiliary brake for supplementing or backing up the service brake.

These spring-applied brakes are fail-safe in the sense that spring force is immediately available to effect a brake application in the event of a malfunction causing loss of pneumatic or hydraulic pressure, which normally acts on a piston to counteract the spring load. In addition, the spring brake provides a convenient and positive parking brake. It will be appreciated, however, that in the absence of any fluid pressure to retract the spring following actuation thereof, the vehicle brakes are locked up, thus requiring a separate means of releasing the spring-applied brake before the vehicle can be moved.

Various manual release means have been proposed to retract the spring and release the brake without requiring pneumatic or hydraulic fluid pressure. These arrangements have not proven entirely satisfactory, however, since it is incumbent upon the operator to release the manual retraction means following reapplication of pneumatic or hydraulic pressure. Should the operator fail to carry out this requirement, the spring will be held in a compressed state by retraction means, thereby preventing the spring-applied brake from being subsequently reapplied, in the event of pneumatic or hydraulic pressure loss.

SUMMARY OF THE INVENTION

The object of the present invention, therefore, is to provide a brake actuator device of the foregoing type having a manual release mechanism for releasing the spring-applied brake by transferring the spring load from the brake-applying apparatus to the brake actuator body.

Another object of the invention is to provide a manual release mechanism of the above character, which is capable of automatically resetting to assure that the spring brake is in a ready state following reapplication of pneumatic or hydraulic pressure.

The foregoing objectives are achieved, in a preferred arrangement of the invention, by manually rotating a retracting screw carried in a spring-applied auxiliary piston, the one end of which forms one part of a friction clutch that is forced into engagement with the other part of the friction clutch by the spring force on the auxiliary piston, whenever fluid pressure normally acting thereon is released. The other clutch part is connected to a long lead screw device on which a service piston is threaded, so as to impart rotation to the other clutch part via the screw device during service piston displacement. When clutch engagement exists, screw rotation is prevented from occurring, so that relative displacement of the service piston is no longer possible. In this way, an existing service brake force can be mechanically locked up by the spring-applied piston, or in the absence of a service brake, the force of the spring acts through the clutch to apply the spring load to the service piston.

The manual release device operates to transfer the spring force from the clutch to the actuator body, thus removing the spring brake force from the service piston and thereby releasing the brakes. The operation is initiated by manually rotating the retraction screw in a clockwise direction into engagement with the other clutch part, thereby forcing the respective clutch parts to disengage. Rotation is thus imparted to the other clutch part, by the force of the brake spring acting through the retracting screw, to allow the spring brake piston to move in a brake application direction without effecting clutch engagement until the spring brake piston engages a stop on the body. The actuating spring is caged in the actuator body in this manner to remove its brake force from the service piston and thus release the spring-applied brake.

Once the spring is caged, an opposing lighter spring acting on the other clutch part drives the retracting screw in a direction opposite the direction of the brake spring. By reason of the screw threads on the retracting screw being the long lead type, this driving force imparts counterclockwise rotation of the retracting screw until the respective clutch parts are again engaged, thereby resetting the retracting screw automatically, in readiness for a subsequent manual release operation. The caged spring is subsequently reactivated by the application of pneumatic or hydraulic pressure to the spring-applied piston, which normally acts on the spring piston to withhold the spring force until a parking brake or emergency brake is desired.

BRIEF DESCRIPTION OF THE DRAWING

The single FIGURE drawing is an elevational view, in section showing a hydraulic brake actuator for a railway vehicle embodying the invention hereinafter described in greater detail.

DESCRIPTION AND OPERATION

The brake actuator embodying the present invention comprises a service piston 1, an auxiliary piston 2, a friction clutch mechanism 3, and a manual release device 4. Service piston 2 operates in a cylinder 5 and forms therewith a pressure chamber 6, to which a passage 6a is fixedly connected to conduct the supply and release of hydraulic fluid. An axial opening 7 in piston 1 houses a long lead type screw member 8 that has screw-threaded engagement with a nut member 9, the latter being fixed, as by a press fit, in service piston 1. An extension 10 of screw member 8 projects through an opening in the wall of cylinder 5 and is connected to a conical clutch seat member 11 of clutch mechanism 3. Clutch seat member 11 is formed with a flange 12 that seats against a thrust bearing 13 under the influence of a spring 14. Another thrust bearing 15 carried on seat member 11 supports one end of spring 14. These bearings 13 and 15 provide for friction free rotation of seat member 11 and consequently screw member 8 to accommodate axial movement of service piston 1, to which a conventional brake shoe 35 may be connected in a variety of well known ways for engagement with a braking surface of a railway vehicle wheel 36.

Auxiliary piston 2 comprises an outer portion 16 that operates in a pressure chamber 17 and an inner portion 18 that projects into a cavity 19, in which the clutch seat member 9 is disposed. Pressure chamber 17 has a passage 17a connected to it via which pneumatic fluid pressure is conducted. Connected to the inner portion of auxiliary piston 2 by bolts 20 is a member 21 of clutch mechanism 3. Member 21 is formed about its periphery with an annular lip 22 that is aligned to engage the mating conical surface 23 of clutch seat member 11. Bolts 20 permit clutch member 21 to float radially relative to its mounting base on auxiliary piston 2, so as to obtain proper alignment and thus positive engagement of the mating clutch surfaces 22, 23 during clutch engagement. Pins 24 project from the non-pressure side of auxiliary piston 2 and enter aligned holes 25 in an end cover 26 of the brake actuator body, to prevent rotation of piston 2 by the torque imparted from clutch seat member 11 during clutch engagement.

An annular recess 27 is formed in the non-pressure side of piston 2, in which a stack of Belleville type disc springs 28 are housed, with one end of the spring stack resting against end cover 26 of the brake actuator body and the other end against the bottom of recess 27, to provide an actuating force on piston 2 in the direction of clutch engagement. Normally, chamber 17 is pressurized with pneumatic fluid to maintain piston 2 in its release position, as shown, in which springs 28 are fully compressed. The force capable of being exerted by springs 28 is considerably greater than the opposing force of spring 14.

Comprising manual release device 4 is a retraction screw 29, that is housed within cylindrical sleeve 30, that in turn fits within a central opening 31 in end cover 26 and in recess 27. An outturned flange 32 of sleeve 30 provides a seat against which the end of the stack of springs 28 acting on piston 2 rest, whereby sleeve 30 is adapted to move axially with piston 2. The end of retraction screw 29 is formed with long lead screw threads 33, which pass through the correspondingly threaded inner portion of piston 2. Contained in clutch seat member 11 axially adjacent the threaded end of retraction screw 29 is a thrust bearing 34, which provides friction free rotation between retraction screw 29 and clutch seat member 11.

As previously mentioned, pneumatic fluid is normally supplied to chamber 17 via passage 17a to hold piston 2 in its release position against end cover 26, as shown. In this position of auxiliary piston 2, clutch member 21 is disengaged from clutch seat member 11, which is accordingly free to rotate and thereby permit rightward axial movement of service piston 1 relative to clutch seat member 11 and screw member 8, in response to the supply of hydraulic fluid pressure to chamber 6 via passage 6a to effect a brake application, it being understood that spring 14 exerts the driving force on friction member 11 to resist axial movement with service piston 1. It should also be understood that service piston 1 is prevented from rotating during axial movement thereof due to its connection with brake shoe 35 and the brake shoe hanger, etc., not shown. Typically, pressurization of the hydraulic fluid is obtained through a hydro-pneumatic converter unit (not shown), in which variation of pneumatic pressure, in turn, varies the pneumatic fluid pressure. In the event a railway car is disconnected from a train or is left standing on a siding, pneumatic pressure at the converter unit normally leaks away over a period of time thus resulting in a loss of hydraulic brake pressure and consequently a loss of braking force. For this reason, a variety of spring-applied brake arrangements have been employed to provide a parking brake for vehicles left standing.

In the present invention, the spring-applied brake is actuated by releasing pneumatic pressure from chamber 17, thereby allowing springs 28 to force piston 2 in a rightward direction until friction clutch mechanism 3 becomes engaged, by reason of clutch member 21 being frictionally connected with seat member 11. When this occurs, clutch seat member 11 is prevented from rotating, since torque pins 24 resist the torque load imparted to piston 2. In the absence of rotation of clutch member 11 and piston 1, no relative axial displacement therebetween can occur, and accordingly the service brake application in effect is mechanically "locked-up". As the brake pressure in chamber 6 is dissipated, the stored energy of parking brake spring 28 acting through the engaged clutch mechanism 3 and screw member 8 is effective to apply braking force. In this respect, the spring-applied brake can be utilized as a parking brake.

Alternatively, the spring-applied brake may be employed as an emergency or back-up brake in the event of failure of the service brake. Such a function relies upon the force of the springs 28 to actually apply the brakes directly, as opposed to the foregoing parking brake function, in which the springs 28 operated to engage the friction clutch mechanism 3 to "lock-up" an existing brake application.

In the absence of an existing brake application, pneumatic fluid may be released from chamber 17 via passage 17a, thereby allowing springs 28 to actuate auxiliary piston 2 and accordingly effect engagement of clutch mechanism 3. This, in turn, locks screw member 8 against rotation, so as to transmit the force of springs 28 to service piston 1 and thereby obtain a brake force corresponding to the effective force of springs 28.

A spring-applied brake application, in accordance with either of the foregoing parking brake or emergency brake functions, may be normally released by reapplying pneumatic pressure to chamber 17 to retract auxiliary piston 2 and thereby effect disengagement of clutch mechanism 3 to restore rotation to clutch member 11 and accordingly to screw member 8. This, in turn, permits axial displacement of service piston 1 and consequent brake release.

In accordance with the present invention, a manual brake release mechanism 4 is provided to release the brakes in the event pneumatic pressure is unavailable to obtain brake release in the normal way. A conventional tool, such as a socket wrench may be applied to the head of retraction screw 29 to turn the screw inwardly until the screw end engages thrust bearing 34 in clutch member 11. Since brake shoe 35 is held against the tread of wheel 36 during application of the brakes, no further rightward movement of piston 1 is possible. Clutch member 21 is thus pulled leftward by further inward turning of screw 29 to cause disengagement of clutch mechanism 3. As torque is maintained on retraction screw 29, the force of springs 28 acting through piston 2 and screw 29 exerts an axial load on clutch member 11, which is free to rotate. This rotation of clutch member 11, in turn rotates screw member 8, to cause axial displacement of auxiliary piston 2, retraction screw 29, clutch member 11, and screw member 3 in a rightward direction relative to service piston 1 until piston 2 engages the body end wall forming chamber 17. When this occurs, springs 28 become caged, by reason of piston 2, on which the spring force acts, being supported by the end wall forming chamber 17, of the brake actuator body, while the opposite end of the spring stack is supported by end cover 26 of the brake actuator. Consequently, the axial loading of clutch member 11 by springs 28 is relieved and the parking brake or emergency brake force is released. Since spring 14 is compressed due to rightward axial displacement of clutch member 11, removal of the tool used to maintain torque on retraction screw 29 allows spring 14 to force clutch member 11 leftward back into engagement with clutch member 21. This leftward movement of clutch movement 11 by spring 14 exerts an axial force on retraction screw 29 via thrust bearing 34. Due to the long lead screw threads 33, retraction screw 29 is caused to turn in a direction to drive the retraction screw outwardly, thereby automatically resetting the retraction screw.

When pneumatic fluid pressure is subsequently resupplied to chamber 17, auxiliary piston 2 is reset and the spring-applied brake is automatically conditioned to reapply, without requiring any action on the part of the operator.

Having now described the invention, what we claim as new and desire to secure by Letters Patent, is:

1. A brake actuator comprising:
   (a) a fluid pressure operated service piston;
   (b) a nut member fixedly carried on said service piston;
   (c) a screw member threadedly engaged with said nut member, so as to rotate in one or the other direction relative thereto and thereby provide for axial displacement of said service piston relative to said screw member in either a brake application or brake release direction;
   (d) an auxiliary piston;
   (e) clutch means including a first friction member connected to said screw member and a second friction member connected to said auxiliary piston;
   (f) first spring means disposed between the casing of said brake actuator and said auxiliary piston for displacing said auxiliary piston in a direction to effect engagement of said second friction member with said first friction member, whereby said screw member is prevented from rotating;
   (g) said auxiliary piston being subject to fluid pressure acting thereon in a direction to oppose said spring means, whereby said first and second friction members are normally disengaged;
   (h) stop means provided by the casing of said brake actuator for limiting said displacement of said auxiliary piston by said spring means, whereby said spring means is caged; and
   (i) a manually operable retraction screw having threaded engagement with said second friction member and engageable with said first friction member in response to rotation in a first direction to effect disengagement of said first and second friction members in the absence of said fluid pressure acting on said auxiliary piston, whereby said spring means is effective to impart rotation to said first friction member and thereby effect displacement of said screw member in a direction to allow said auxiliary piston to engage said stop means.

2. A brake actuator as recited in claim 1, further comprising second spring means for urging said first friction member toward engagement with said second piston member whereby an axial force is transmitted from said first friction member to said retraction screw to effect rotation thereof in a direction opposite said first direction following engagement of said auxiliary piston with said stop means.

3. A brake actuator as recited in claim 2, further characterized in that said first spring means is stronger than said second spring means.

4. A brake actuator as recited in claim 1 or 2, further characterized in that said screw member is formed with long lead screw threads by which said screw member is connected to said nut member, whereby axial forces on said service piston are translated into said rotation of said screw member to provide said axial displacement of said service piston.

5. A brake actuator as recited in claim 2 or 3 further characterized in that said retraction screw is formed with long lead screw threads by which said retraction screw is connected to said second friction member, whereby said axial force of said second spring means acting on said retraction screw via said first friction member is translated into said rotation of said retraction screw.

6. A brake actuator as recited in claim 1 or 2, further comprising a bearing member carried by said first friction member adjacent said retraction screw.

7. A brake actuator as recited in claim 1, further comprising means for preventing rotation of said auxiliary piston.

8. A brake actuator is recited in claim 1, wherein said first spring means comprises a plurality of disc type springs.

* * * * *